United States Patent
Greenberger et al.

(10) Patent No.: US 10,423,833 B2
(45) Date of Patent: Sep. 24, 2019

(54) SETTING A PERSONAL STATUS USING AUGMENTED REALITY

(71) Applicant: INTERNATIONAL BUSINESS MACHINES CORPORATION, Armonk, NY (US)

(72) Inventors: Jeremy A. Greenberger, San Jose, CA (US); Zachary M. Greenberger, Raleigh, NC (US); Jeffrey A. Kusnitz, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/003,059

(22) Filed: Jun. 7, 2018

(65) Prior Publication Data

US 2018/0285645 A1 Oct. 4, 2018

Related U.S. Application Data

(63) Continuation of application No. 15/405,137, filed on Jan. 12, 2017.

(51) Int. Cl.
| | |
|---|---|
| *G06T 11/60* | (2006.01) |
| *G06K 9/00* | (2006.01) |
| *G06F 3/14* | (2006.01) |
| *G06F 3/147* | (2006.01) |

(52) U.S. Cl.
CPC ........... *G06K 9/00671* (2013.01); *G06F 3/14* (2013.01); *G06F 3/147* (2013.01); *G06K 9/00288* (2013.01); *G06T 11/60* (2013.01); *G06K 9/00221* (2013.01); *G09G 2340/10* (2013.01); *G09G 2340/125* (2013.01)

(58) Field of Classification Search
CPC .......................... G06F 11/3055; G06F 11/328
USPC ......................................................... 345/633
See application file for complete search history.

(56) References Cited

U.S. PATENT DOCUMENTS

| | | | |
|---|---|---|---|
| 7,847,815 B2 | 12/2010 | Patel | |
| 8,230,367 B2 | 7/2012 | Bell | |
| 9,530,326 B1 * | 12/2016 | Ramloll | ................... G09B 5/02 |
| 2009/0113311 A1 | 4/2009 | Fried | |
| 2009/0300525 A1 * | 12/2009 | Jolliff | ............... H04M 1/72544 |
| | | | 715/764 |
| 2012/0075433 A1 | 3/2012 | Tatzgern et al. | |

(Continued)

FOREIGN PATENT DOCUMENTS

EP 2426645 B1 2/2013

OTHER PUBLICATIONS

List of IBM Patents or Applications Treated as Related.

(Continued)

*Primary Examiner* — Thomas J Lett (74) *Attorney, Agent, or Firm* — Intelletek Law Group, PLLC; Gabriel Daniel, Esq.

(57) ABSTRACT

A computer system, method, and computer readable product are provided for setting a personal status using augmented reality. In various embodiments, an augmented reality computing device captures an image of a physical scene, which includes a person. The computing device then identifies the person, and accesses a personal status for that person. The computing device generates and displays an augmented reality image that displays the personal status in proximity to the person in the scene.

20 Claims, 8 Drawing Sheets

(56) References Cited

U.S. PATENT DOCUMENTS

| | | |
|---|---|---|
| 2014/0002643 A1 | 1/2014 | Aziz |
| 2014/0232747 A1 | 8/2014 | Sugimoto et al. |
| 2015/0095310 A1* | 4/2015 | Beaurepaire .......... G06F 3/0484 |
| | | 707/722 |
| 2015/0309316 A1 | 10/2015 | Osterhout et al. |
| 2016/0026853 A1 | 1/2016 | Wexler et al. |

OTHER PUBLICATIONS

Anonymous, "A Dynamic Authentication Method for Use Within an Augmented Reality Headset", ip.com Prior Art Database Technical Disclosure, No. IPCOM000238453D, Aug. 27, 2014.

* cited by examiner

Status / Question:

| Input Field 302 | Share 306 |

Visibility:

○ Public 304a   ○ Presenter 304b   ○ Specific Person 304c

Selection Field 304d

SETTING A PERSONAL STATUS USING AUGMENTED REALITY

BACKGROUND

The present disclosure relates to augmented reality (AR), and more specifically, it relates to setting a personal status using augmented reality.

Augmented reality may combine, or augment, a view of the physical world with computer-generated elements. For instance, a video of the physical world captured by a smart phone's camera may be overlaid with a computer-generated image when it is displayed on the smart phone's screen. This computer-generated image may be a still image or video. Additionally, augmented reality may be produced via other outputs, such as via a sound outputted by the smart phone. There are also glasses-type augmented reality devices that, to a user wearing such a device, overlay an image on what he or she sees in the physical world through those glasses.

In addition to a video of the physical world, other aspects of the physical world may be captured and used to augment reality. These aspects include accelerometer data of a device, a direction that the device is pointed to based on compass data, and a physical location of the device based on GPS (Global Positioning System) data.

SUMMARY

In various embodiments, a computing device that implements an embodiment of the present disclosure, captures an image of a physical scene, the physical scene including a first person. The computing device then determines an identity of the first person based on analyzing the image.

After determining the identity of the first person, the computing device determines that there is a personal status for the first person based on the determined identity of the first person. Then, the computing device generates an augmented reality image based on the personal status for the first person such that the personal status is displayed in a location proximal to the first person.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Handling questions and comments in a group setting, like a meeting or presentation, can be challenging for both the person who currently has the floor and the person who wishes to interject. For example, the person who has the floor may lose his or her place in what he or she is saying. Some ways that someone may interject include, raising a hand, typing a question into a web meeting room, and waiting until the end of the presentation to say something—and, if embarrassed, the person who wishes to interject may not say anything at all.

A solution to handling questions and comments in a group setting, then, may be effectuated using augmented reality techniques. For example, Person A may wear an augmented reality device, such as an eyeglasses-type augmented reality device. Person B may set a personal status on a computer, along with a viewing access for the status (e.g., who may view the status). Person A's augmented reality device may recognize Person B, then retrieve Person B's status, and display it near Person B's status. Person B may change and/or clear his or her status as desired. These techniques may be applied to more than a single person's status. For example, in a lecture hall with many students, Person A may use a plurality of personal statuses from the students to gauge class participation.

Figure 1:
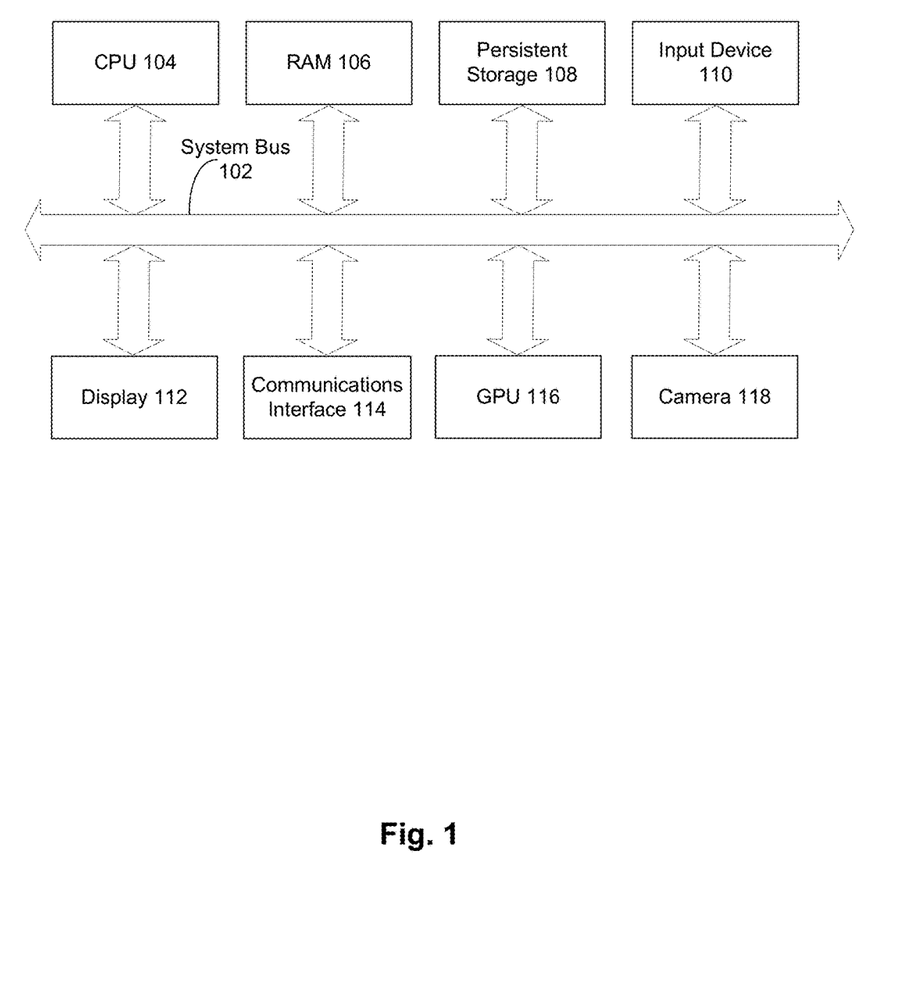
FIG. 1 illustrates examples of hardware used according to embodiments of the present disclosure.

FIG. 1 illustrates an example of hardware used according to an embodiment of the present disclosure. As shown in FIG. 1, a block diagram illustrates examples of computer hardware that may be used according to embodiments of the present disclosure for setting a personal status using augmented reality. In some embodiments, the computer hardware of FIG. 1 may be embodied in eyewear warn by a user on his or her face.

CPU (central processing unit) 104, RAM (random access memory) 106, persistent storage 108, input device 110, display 112, communications interface 114, GPU (graphics processing unit) 116, and camera 118 are connected to a system bus 102. It may be appreciated that system bus 102 is presented logically and simplified, and that two or more of these components may be communicatively coupled by one or more separate buses. It also may be appreciated that the depictions of CPU 104 and GPU 116 are simplified to emphasize the components that are depicted—for example they omit hardware that controls the flow of computer-executable instructions within them.

In FIG. 1, persistent storage 108, in an embodiment of the present disclosure, has capabilities that include storing a program that can execute the processes described herein. Persistent storage 108, in an embodiment of the present disclosure, can store an executing application that effectuates setting a personal status using augmented reality, as well as viewing another user's personal status using augmented reality.

Additionally, in FIG. 1, an input device 110, such as a keyboard and a mouse may be used to provide input to the computer hardware of FIG. 1. For example, this input may be made by a user to identify that user's personal status. Where the hardware takes the form of eyeglasses, the input device may take the form of a microphone used to capture voice input or hardware buttons on the eyeglasses, for example.

In one embodiment, the communications interface 114 of FIG. 1 is connected to a communications network using a Wi-Fi or LTE (long-term evolution) network communications protocol. Communications interface 114 may also comprise a network interface card (NIC) that is connected to a communications network via an Ethernet cable. In the present disclosure, communications interface 114 may be used to transmit a user status to one or more other computers, which may include a central computer that stores statuses and conveys them to hardware used by other users. Communications device 114 may also be used to receive information about other users' statuses. These external computers may be accessible via a communications network.

In the present disclosure, communications interface 114 may receive processing requests in accordance with a communication protocol, for example TCP/IP (Transmission Control Protocol/Internet Protocol), from another computer (not shown), and processing results are sent to a third computer (not shown). As depicted, communications interface 114 may comprise hardware for transmitting and receiving network data, and/or processor-executable instructions for doing the same.

Figure 2:
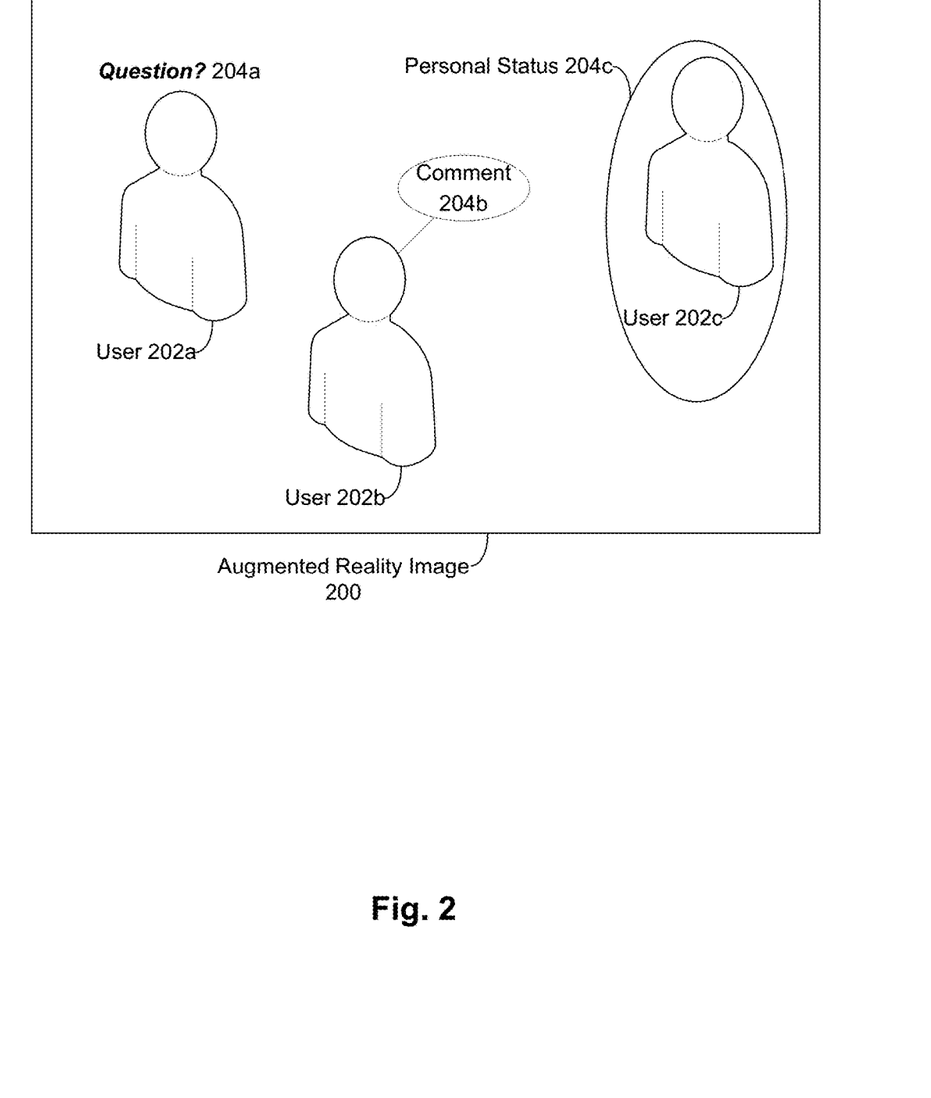
FIG. 2 illustrates an example of an augmented reality image that displays a personal status that may be generated according to embodiments of the present disclosure.

FIG. 2 illustrates an example of an augmented reality image that displays a personal status that may be generated according to some embodiments of the present disclosure. The augmented reality image of FIG. 2 may be generated by performing the process of FIG. 6.

As depicted, there are three people in augmented reality image 200—person 202a, person 202b, and person 202c. Then, each person has an associated personal status that is being displayed—person 202a has personal status 204a, person 202b has personal status 204b, and person 202c has personal status 204c. The manner in which these three personal statuses are being rendered and displayed illustrates examples of how personal statuses may be conveyed, though it may be appreciated that there may be more ways in which personal statuses may be conveyed.

Here, status 204a is a question and it is displayed in a first text style (such as a first color). Then, status 204b is a comment, and it is displayed in a different text style (such as a second color) relative to status 204a, as well as stylized in the form of a talk bubble rather than bare text. It may be useful to display comments and questions in a different manner, so that a user viewing augmented reality image 200 can easily scan to distinguish between one and the other.

Note also that status 204a and status 204b are displayed in different positions relative to their corresponding user (user 202a and user 202b, respectively). While status 204a is displayed over the head of user 202a, status 204b is displayed up and to the right of user 204b—again, in a comment bubble as well. These two positioning of status relative to a user are by way of example and there are other ways that statuses may be displayed. For instance, a status may be displayed across a person's torso.

For example, status 204c for user 202c differs from status 204a and status 204b because status 204a is not text. Here, status 204c is an oval that surrounds user 202c, to convey that user 202c has a question or comment, and would like to be called upon by a presenter. There are other ways that statuses may be conveyed without text, such as by using emoji or images.

Augmented reality image 200 may comprise these personal statuses overlaid upon on an image of a physical scene that is captured by a computer and displayed on a computer display. In other embodiments, such as where the computing device that generates the augmented reality image takes the form of eyeglasses, it may be that the user of the augmented reality device is himself or herself looking at this physical scene that was captured, so the personal statuses are rendered and displayed in the user's field of view while looking at the physical scene directly.

In some embodiments, a personal status for a person may be displayed differently to a second person depending on whether the second person has already viewed this personal status. For example, the first time the second person views the personal status, it may be displayed as above, and any subsequent time the second person views that personal status, it may be displayed with an icon indicating that it has been previously viewed. Or vice versa, where the icon is shown the first time the second person views the personal status and the icon is then not shown subsequently. In other embodiments, the opacity of the personal status may be changed between the initial time a particular person views it and subsequent times. It may be appreciated that there may be other techniques used to distinguish between an initial time someone views a particular status, and subsequent times.

Figure 3:
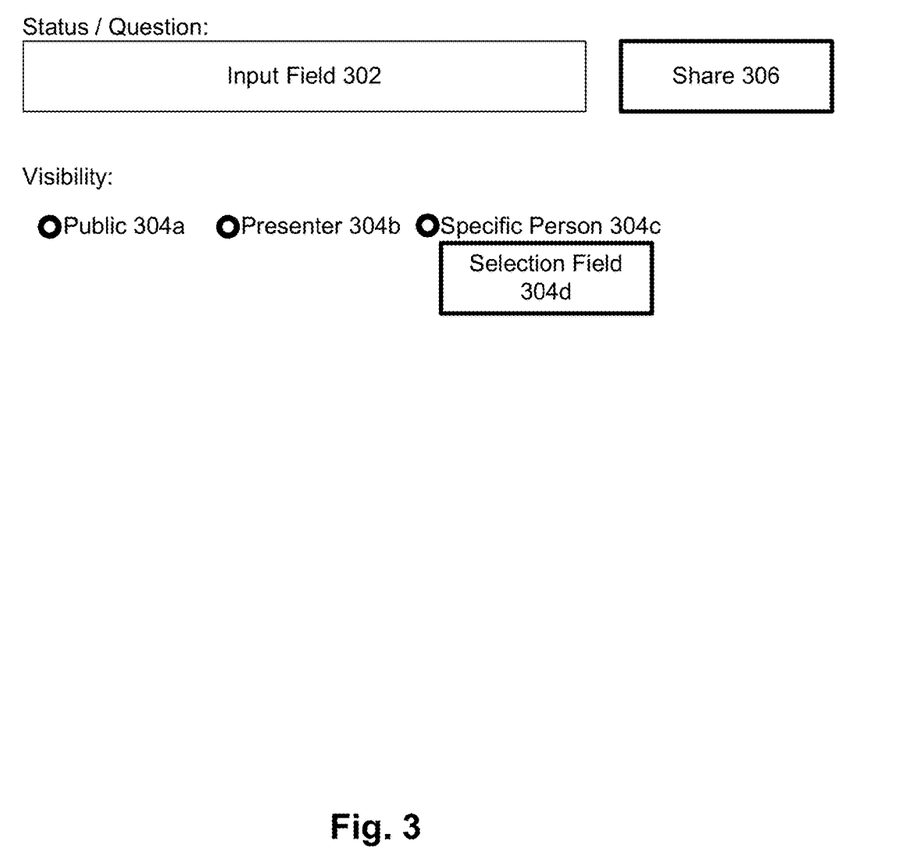
FIG. 3 illustrates an example user interface for setting a personal status according to embodiments of the present disclosure.

FIG. 3 illustrates an example user interface for setting a personal status according to embodiments of the present disclosure. In some embodiments, the user interface of FIG. 3 may be implemented in a web page or an app that is implemented upon the computer hardware of FIG. 1. This user interface comprises input field 302, where a user may input his or her personal status.

Then, a user may also specify a permission associated with viewing the personal status, which may limit who is (or which user accounts are) able to access and view the personal status. A user of the user interface may select that the permission is public 304a (that anyone may access and view the status), Presenter 304b (that only the person or people who are acting as a presenter in the current setting may access and view the status), or Specific Person 304c (that only one or more specific people may access and view the status)—with selection field 304d being used to identify the specific person or persons who have this permission.

Figure 4:
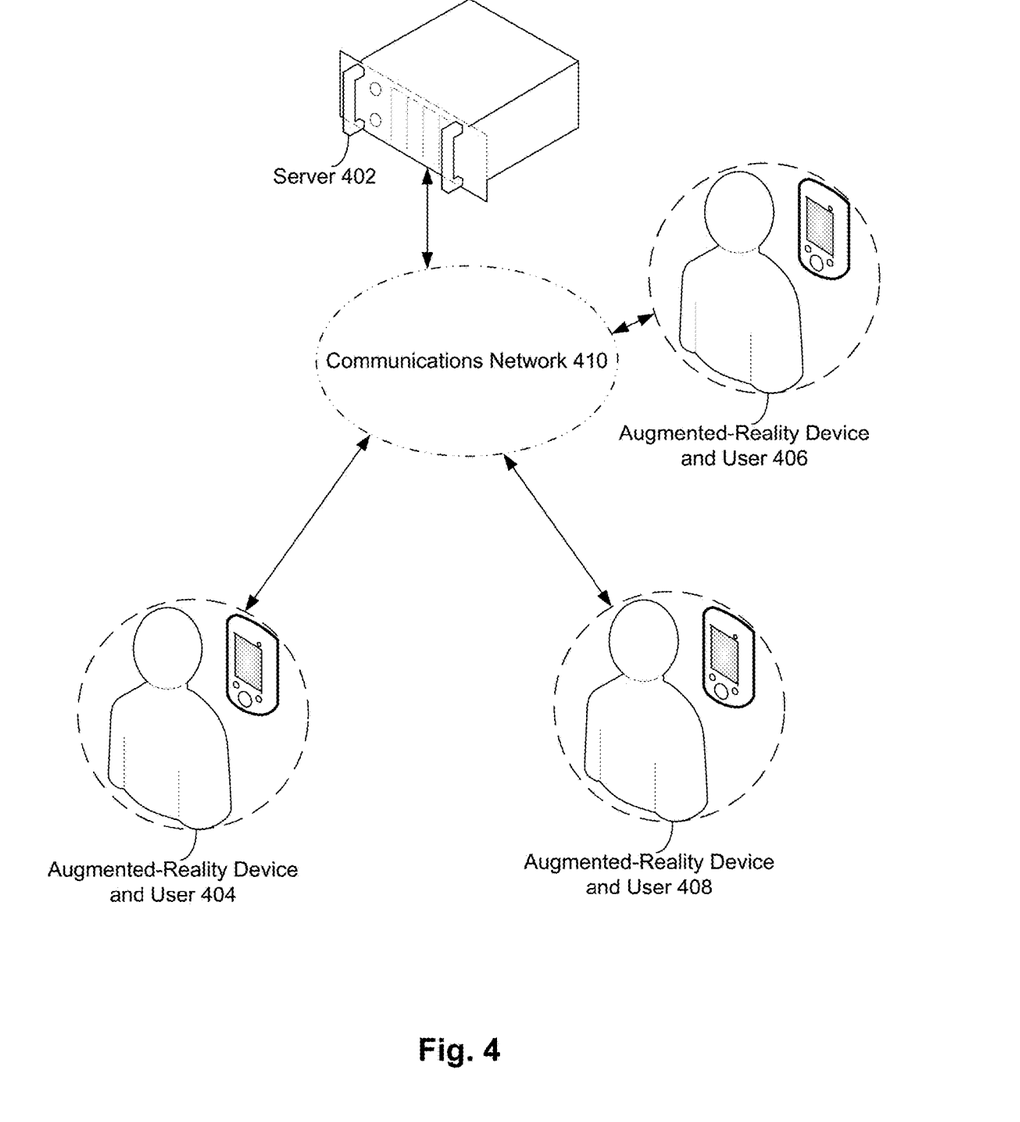
FIG. 4 illustrates an example system architecture incorporating a central server according to embodiments of the present disclosure.

Once a user has identified a personal status as well as an associated permission in the user interface, the user may select a share button 306, which shares this personal status with the specified people (such as by uploading an indication of the personal status and associated permissions to central server 402 of FIG. 4).

FIG. 4 illustrates an example system architecture including a central server according to some embodiments of the present disclosure. This example architecture comprises central server 402, augmented reality device and user 404, augmented reality device and user 406, augmented reality device and user 408, and communications network 410. Each of the central server 402 and the three depicted augmented reality devices may be implemented on an instance of the computer hardware of FIG. 1. In one embodiment, the communications network may be the INTERNET.

In this example system architecture, when a user sets a personal status (such as via the user interface of FIG. 3), that personal status may be sent across communications network 410 to central server 402. Central server 402 may then process the personal status, and then send it to one or more of the augmented reality devices (based on a permission associated with the personal status), so that the augmented reality devices may create an augmented reality image that includes the personal status. This augmented reality image may be augmented reality image 200 of FIG. 2.

While each user is depicted here as using an augmented reality device, it may be appreciated that there are embodiments where a non-augmented reality device, such as a laptop computer, is used by a user to set a personal status. This central server architecture of FIG. 4 may be contrasted with a peer-to-peer architecture as depicted in FIG. 5.

Figure 5:
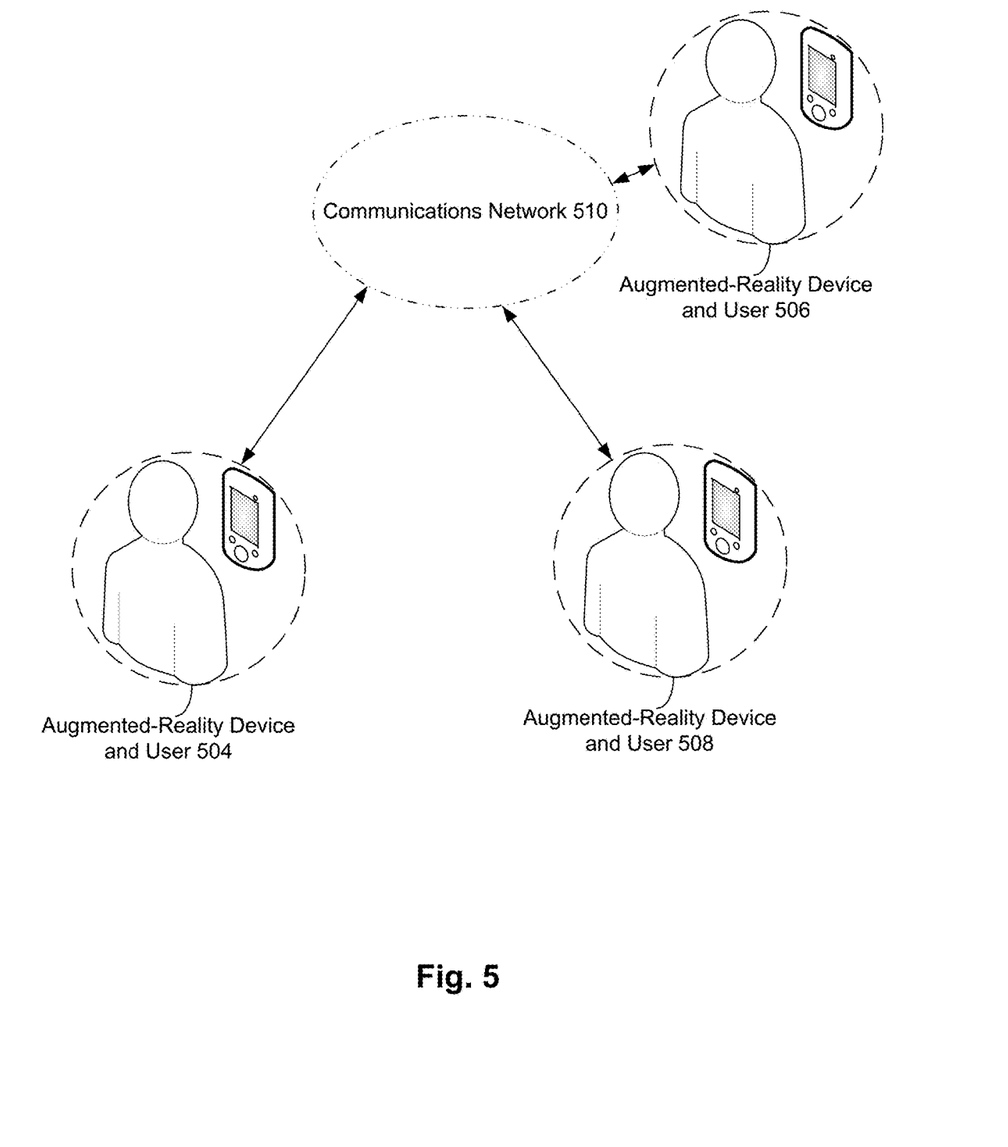
FIG. 5 illustrates an example system architecture incorporating peer-to-peer communication according to embodiments of the present disclosure.

FIG. 5 illustrates an example system architecture incorporating peer-to-peer communication according to embodiments of the present disclosure. Whereas in FIG. 4 there was central server 402 to receive and then propagate personal statuses to augmented reality devices, as depicted, no central server appears in FIG. 5. In contrast the three depicted augmented reality devices (here depicted with a corresponding user)—augmented reality device 504, augmented reality device 506, and augmented reality device 508—may directly communicate across communications network 510, which may be similar to communications network 410 of FIG. 4.

Each of these augmented reality devices 506-510 may register its existence with the other augmented reality devices according to a peer-to-peer discovery protocol. Then, when a user enters a personal status, that personal status may be propagated to other augmented reality devices without the use of a central server. It may be appreciated that there may be other system architectures used for setting a personal status using augmented reality, such as those that may combine a central server (such as to store personal statuses for later, as described further on in the disclosure) as well as a p2p protocol for conveying personal statuses between augmented reality devices.

Figure 6:
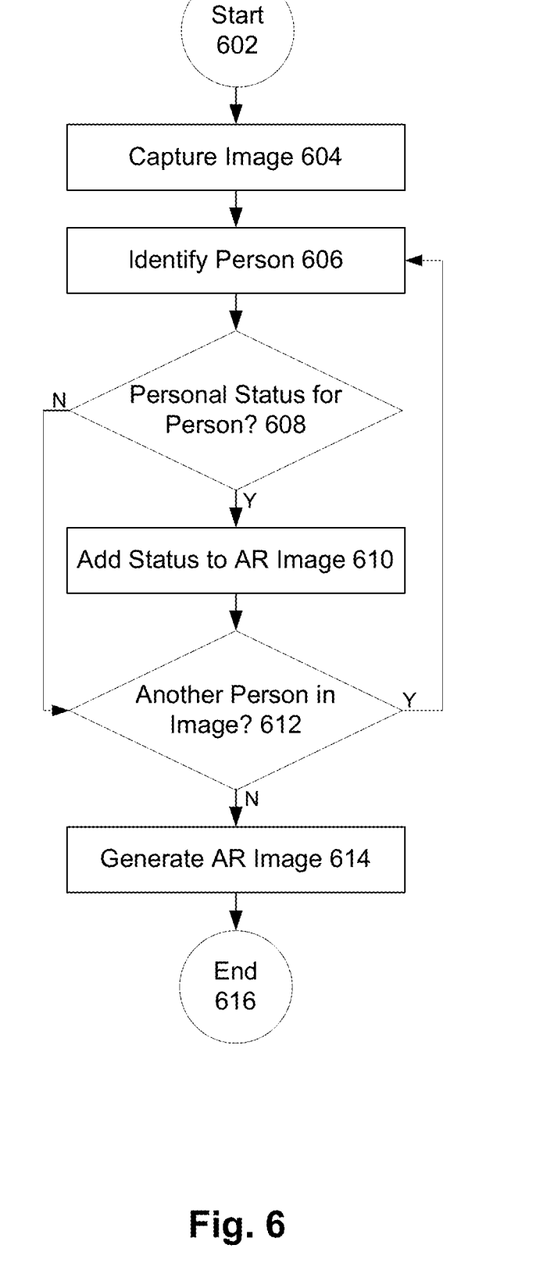
FIG. 6 illustrates an example process for generating an augmented reality image that includes a personal status according to embodiments of the present disclosure.

FIG. 6 illustrates an example process for generating an augmented reality image that includes a personal status according to embodiments of the present disclosure. In some embodiments, the process of FIG. 6 may be implemented on the computer hardware of FIG. 1 to effectuate setting a personal status using augmented reality. In some embodiments, the process of FIG. 6 may be implemented to effectuate a computer-implemented method for viewing a personal status using augmented reality.

It may be appreciated that the process of FIG. 6 is an example process, and that there may be embodiments that implement more or fewer operations than are disclosed. It may also be appreciated that there may be embodiments that implement the operations of FIG. 6 in a different order than they are depicted in FIG. 6.

It may further be appreciated that the operations of FIG. 6 may be implemented in conjunction with the operations of other figures. For example, the operations of FIG. 6 may be implemented in conjunction with the operations of FIG. 7, which may provide for updating an augmented reality image that has personal statuses as the user of the augmented reality device, or a person captured by the augmented reality device, moves over time.

Figure 8:
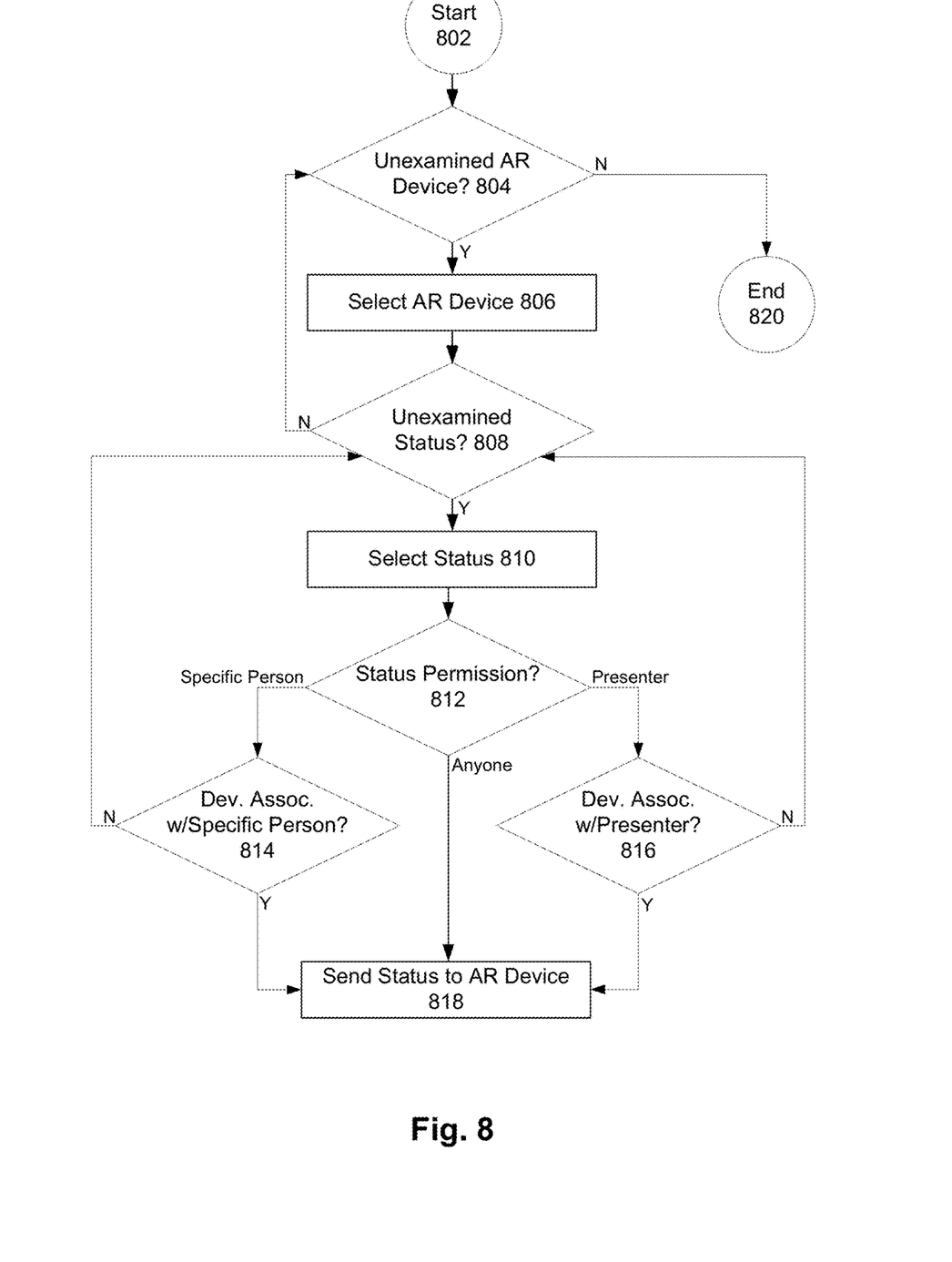
FIG. 8 illustrates an example process for generating an augmented reality image that includes a personal status that has a permission associated with it according to elements of the present disclosure.

By way of another example, the operations of FIG. 6 may be implemented in conjunction with the operations of FIG. 8, which may provide for generating an augmented reality image with personal statuses, based on which personal statuses a given user account has permissions to access.

The process of FIG. 6 begins with operation 602 and moves to operation 604. Operation 604 depicts capturing an image. Where the process of FIG. 6 is implemented by the computer hardware of FIG. 1, camera 118 may capture this image, and this image may either be a discrete image, or part of a video that is being captured by the camera. In some embodiments, operation 604 may comprise capturing an image of a physical scene, the physical scene including a first person. After operation 604, the process of FIG. 6 moves to operation 606.

Operation 606 depicts identifying a person in the captured image. In some embodiments, possible faces of people in the captured image may be identified, and these possible faces may be compared against a stored database of known faces to identify the faces in the image. This form of facial recognition may be performed according to a variety of techniques, such as by identifying and comparing features of a face (like a relative position, size, and/or shape of a nose, eyes, mouth, or ears on a face), or three-dimensional face recognition (where camera 118 is a three-dimensional camera).

In some embodiments, a person may be identified in the captured image using techniques other than facial recognition. For example, a physical location of a person may be determined based on physically locating a computing device that the person has with him or her, such as a cellular telephone. The physical location of a person's computing device (and therefore, the person himself or herself where there is a known association between the computing device and the person) may be determined using Wi-Fi triangulation, where Wi-Fi access points may determine a distance between the access point and the computing device, and/or an angle between the access point and the computing device. This angle and distance information from one or more Wi-Fi access points (along with information about a physical location of the access points) may generally be combined to determine a physical location for the computing device.

A similar approach to determining the position of a computing device (and therefore, the owner of the device) may be performed using BLUETOOTH LOW ENERGY (BLE) beacons. Interaction between the computing device and a BLUETOOTH beacon using a BLUETOOTH protocol may be used to determine the computing device's physical position relative to that beacon. Then, that relative positioning information may be combined with other sources of information about the computing device's physical location (such as the device's relative position to one or more other BLUETOOTH beacons) to establish a physical location for the computing device. While the embodiments described herein primarily involve use of facial recognition to identify a person, it may be appreciated that these techniques, as well as others, may be used as well to identify a person.

In some embodiments, operation 606 may comprise determining an identity of the first person based on performing facial recognition on the image. In some embodiments, operation 606 may comprise determining an identity of a first person based on performing facial recognition on a captured image of a physical scene, the captured image comprising an image of the first person. After operation 606, the process of FIG. 6 moves to operation 608.

Operation 608 depicts determining whether there is a personal status for the identified person. Where operation 608 is implemented by an augmented reality device, the augmented reality device may determine whether there is such a personal status in a variety of ways, such as depending on whether there is a central server or peer-to-peer (p2p) architecture, and whether the mechanism by which the augmented reality device determines that there is a new status is a push or a pull mechanism.

For example, using a central server architecture (such the one depicted in FIG. 4) with a pull mechanism, when the identified person creates or updates a personal status, that personal status is sent to the central server, and then the augmented reality device queries the central server for a personal status for the identified user upon identifying the user. By way of another example, using a p2p architecture with a push mechanism, when the identified person creates or updates the personal status, a computing device of that identified person then pushes the identified status to the augmented reality device, and the augmented reality device may store that personal status and then access it here in operation 608.

In some embodiments, operation 608 may comprise, in response to determining the identity of the first person, determining whether there is a personal status for the first person based on the determined identity of the first person. If it is determined in operation 608 that there is a personal status for the identified person, then the process of FIG. 6 moves to operation 610. Instead, if it is determined in operation 608 that there is not a personal status for the identified person, then the process of FIG. 6 moves to operation 612.

Operation 610 is reached from operation 608 where, in operation 608, it is determined that there is a personal status for the identified person. Operation 610 depicts adding the personal status to an augmented reality image. In some embodiments, adding the personal status to an augmented reality image may comprise storing an indication of the personal status, along with other personal statuses that are to be added to the image (through looping through operations 606-612 to examine each person in the captured image). Then, once all personal statuses to be included in an augmented reality image have been identified, the augmented reality image that includes those personal statuses may be generated in operation 614.

In addition to generating an augmented reality image based on a personal status for one or more people in a captured image, these personal statuses may be saved for later, for example so that a lecturer may access the questions and comments from the students in his or her class. Saving personal statuses for later may be done for an individual person's statuses, such as by saving an indication of the personal status in a computer memory, saving an indication of a second personal status for the first person in a computer memory, and displaying the indication of the personal status and the indication of the second personal status on a computer display, independent of a physical location of the first person.

Saving personal statuses for later may be done for multiple people together (e.g., the students in a given class), such as by saving an indication of the personal status in a computer memory, saving an indication of a second personal status for a second person in a computer memory, displaying the indication of the personal status and the indication of the second personal status on a computer display, independent of a physical location of the first person and a physical location of the second person. After operation 610, the process of FIG. 6 moves to operation 612.

Operation 612 is reached from operation 610, or from operation 608 upon determining that there is not a personal status for the identified person. Operation 612 depicts determining whether there is another person in the image. Determining whether there is another person in the image may be performed using facial recognition techniques, such as those described with respect to operation 606, to identify landmarks (such as a nose, mouth, or eyes) in the image that are indicative of a face.

While the process of FIG. 6 depicts identifying the people in the captured image as occurring one at a time, with a personal status then being identified for that person, it may be appreciated that there are alternate embodiments. For example, in some embodiments, each person in the captured image may first be identified before a personal status for each of those people is identified.

Upon determining that there is another person in the image, the process of FIG. 6 returns to operation 606. Through this loop from operations 606-612, each person in the image may be identified, and it may be determined if each person has a personal status set. However, upon determining that there is not another person in the image, then the process of FIG. 6 moves to operation 614.

Operation 614 depicts generating an augmented reality image. In some embodiments, the augmented reality image may be generated based on combining the captured image overlaid with each personal status for the people in the image. In other embodiments, the augmented reality device may be able to overlay images onto what its user is actually looking at (such as with an eyeglasses-type augmented reality device) rather than onto a captured image. In these embodiments, generating the augmented reality image may include generating an image that comprises each personal status, where those personal statuses are rendered in a location within the user's field of view that corresponds to the person whose personal status it is.

In some embodiments, operation 614 comprises generating an augmented reality image based on the personal status for the first person, such that the personal status is displayed in a location proximal to the first person. In some embodiments, the location proximal to the first person is a location above the first person's head. Operation 614 may comprise generating the augmented reality image based on the personal status for the first person with the personal status colored with a first color in response to determining that the first status is indicative of a question, and generating the augmented reality image based on the personal status for the first person with the personal status colored with a second color in response to determining that the first status is indicative of a comment.

The personal status of one or more people may be updated (for example either to a new status, or cleared) after the augmented reality image is generated in operation 614. In such embodiments, updating a personal status may comprise, after generating the augmented reality image, determining that the personal status of the first person has been updated, and generating a second augmented reality image based on the updated personal status for the first person such that the updated personal status is displayed in a location proximal to the first person.

Where a personal status is updating by way of clearing the personal status, so that there is no longer an active personal status associated with a given person, clearing the personal status may be effectuated by, after generating the augmented reality image, determining that the personal status of the first person has been updated to indicate no personal status, and generating a second augmented reality image based on the updated personal status for the first person such that the second augmented reality image shows no personal status for the first person. After operation 614, the process of FIG. 6 moves to operation 616, where the process of FIG. 6 ends.

Figure 7:
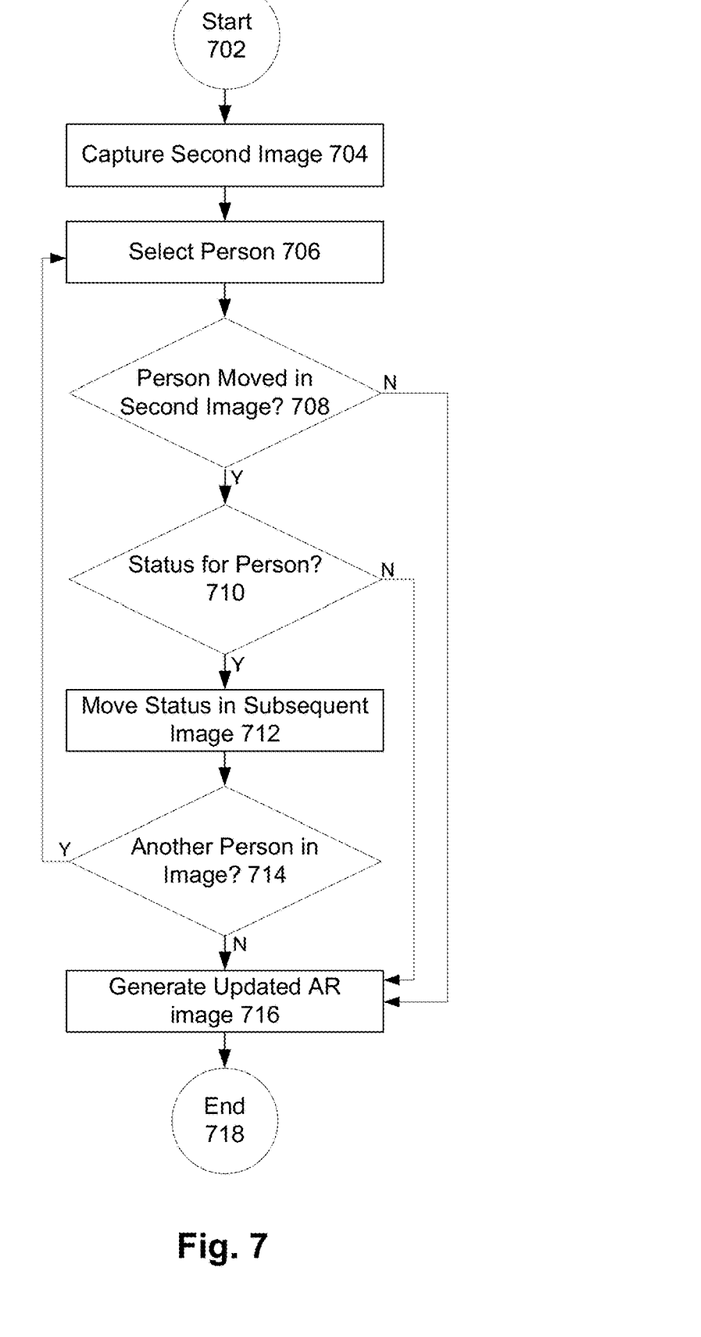
FIG. 7 illustrates an example process for updating an augmented reality image that includes a personal status according to embodiments of the present disclosure.

FIG. 7 illustrates an example process for updating an augmented reality image that includes a personal status according to embodiments of the present disclosure. In some embodiments, the operations of FIG. 7 may be implemented on the computer hardware of FIG. 1 to effectuate setting a personal status using augmented reality. It may be appreciated that the operations of FIG. 7 are example operations, and that there may be embodiments that implement more or fewer operations than are disclosed. It may also be appreciated that there may be embodiments that implement the operations of FIG. 7 in a different order than they are depicted in FIG. 7.

The process of FIG. 7 begins with operation 702 and then moves to operation 704. Operation 704 depicts capturing a second image. In some embodiments, operation 704 may be implemented in a manner similar to that of capturing an image, as performed in operation 604 of FIG. 4. This second image may generally be considered to be captured at a time subsequent to a time when a previous image was captured. Where the images are part of a video, this second image may be a frame of the video that is subsequent to a prior frame of the video.

In some embodiments, operation 704 may comprise capturing a second image, the first person being in a different location in the second image than in the first image. After operation 704, the process of FIG. 7 moves to operation 706.

Operation 706 depicts selecting a person depicted in the second image. Selecting a person depicted in the second image may be performed in a manner similar to that of operation 606 of FIG. 6 (i.e., identifying a person in a captured image), and operation 612 of FIG. 6 (determining whether there is another person in the captured image). After operation 706, the process of FIG. 7 moves to operation 708.

Operation 708 depicts determining whether the selected person has moved in the second image relative to a previous image. There may be a few general ways that a person may move position within an image between two images. In various scenarios, the person may have moved, the augmented reality device that captures the person may have moved, both the person and the augmented reality device may have moved, and another person or object may have moved between the person and the augmented reality device so that the person is now obfuscated in the image. Determining whether the selected person has moved between the two images may then be performed by a comparison of the two images, where the person is identified in each image and the position within each image of the person is compared.

Upon determining in operation 708 that the selected person has moved in the second image relative to the previous image, then the process of FIG. 7 moves to operation 710. Instead, upon determining in operation 708 that the selected person has not moved in the second image relative to the previous image, then the process of FIG. 7 moves to operation 714.

Operation 710 is reached from operation 708 upon determining in operation 708 that the selected person has moved in the second image relative to the previous image. Operation 710 depicts determining whether there is a personal status for the selected person. In some embodiments, operation 710 may be implemented in a similar manner as implementing operation 608 of FIG. 6.

If it is determined in operation 710 that there is a personal status for the selected person, then the process of FIG. 7 moves to operation 712. Instead, if it is determined in operation 710 that there is not a personal status for the selected person, then the process of FIG. 7 moves to operation 714.

Operation 712 is reached from operation 710, upon determining that there is a personal status for the person. Operation 712 depicts moving the personal status for the selected person in a subsequent augmented reality image. So, as personal statuses are displayed using augmented reality, those personal statuses may be rendered in augmented reality images in a fixed location relative to their corresponding person—for instance, some distance above the person's head. As the person moves within the captured image, the position at which the personal status is rendered may be correspondingly moved when rendering the augmented reality image, so that this relation between the position of the person and the position of the personal status remains constant.

In some embodiments, there may be other considerations that affect the positioning of a personal status in an augmented reality image. For example, if two people in the image with personal statuses are standing in close proximity, it may be that rendering their statuses according to the default status-positioning behavior would result in one status obfuscating another status. In such embodiments, it may be that such obfuscation is detected, and where it would result from the default behavior, at least one of the statuses is rendered in a different location than the default so that no obfuscation occurs. After operation 712, the process of FIG. 7 moves to operation 714.

Operation 714 is reached from operation 712, from operation 708 upon determining that the selected person did not move in the second image relative to a prior image, and from operation 710 upon determining that there is not a personal status for the selected person. Operation 714 depicts determining whether there is another person depicted in the image. In some embodiments, operation 714 may be implemented in a similar manner as operation 612 of FIG. 6, which also depicts determining whether there is another person depicted in an image.

If it is determined in operation 714 that there is another person in the image, the process of FIG. 7 returns to operation 708. Instead, if it is determined in operation 714 that there is not another person in the image, then the process of FIG. 7 moves to operation 716.

Operation 716 is reached from operation 714, upon determining that there is not another person in the image. Operation 716 depicts generating an updated augmented reality image. Generating this updated reality image may comprise generating an augmented reality image based on the moved statuses that are determined from operation 712, as well as any statuses that have not moved (because the corresponding person has not moved within the captured image relative to a prior captured image).

In some embodiments, operation 716 may comprise generating a second augmented reality image based on the personal status for the first person such that the personal status is displayed in a location proximal to the first person being in the different location. After operation 716, the process of FIG. 7 moves to operation 718, where the process of FIG. 7 ends.

FIG. 8 illustrates an example process for generating an augmented reality image that includes a personal status that has a permission associated with it according to elements of the present disclosure. In some embodiments, the operations of FIG. 8 may be implemented on the computer hardware of FIG. 1 to effectuate setting a personal status using augmented reality. For example, the operations of FIG. 8 may be implemented on central server 402 of FIG. 4 or by one of augmented reality devices 504-508 of FIG. 5 to determine whether to send a particular personal status to another augmented reality device, based on its permissions.

It may be appreciated that the operations of FIG. 8 are example operations, and that there may be embodiments that implement more or fewer operations than are disclosed. It may also be appreciated that there may be embodiments that implement the operations of FIG. 8 in a different order than they are depicted in FIG. 8.

The process of FIG. 8 begins with operation 802, and moves to operation 804. Operation 804 depicts determining whether there is an unexamined augmented reality device. In some embodiments, a list or other data structure includes an indication of each augmented reality device. This list may be maintained by a central server, like central server 402 of FIG. 4, or by each augmented reality device where a p2p architecture is used as in FIG. 5. An augmented reality device may register itself to the central server or other augmented reality devices when it connects to a corresponding communications network, or otherwise performs operations to receive and display personal statuses using augmented reality. Once an augmented reality device registers itself, the central server or other augmented reality devices may store an indication of that registered augmented reality device in the list. Then, determining whether there is an unexamined augmented reality device may comprise traversing the list, and determining whether the end of the list has been reached (which may indicate that there is not an un-examined augmented reality device).

If it is determined in operation 804 that there is an unexamined augmented reality device, then the process of FIG. 8 moves to operation 806. Instead, if it is determined in operation 804 that there is not an unexamined augmented reality device, then the process of FIG. 8 moves to operation 820, where the process of FIG. 8 ends.

Operation 806 is reached from operation 804, upon determining that there is an unexamined augmented reality device. Operation 806 depicts selecting an augmented reality device. Using the example of maintaining a list of augmented reality devices from operation 804, operation 806 may comprise selecting the next unexamined augmented reality device in this list. After operation 806, the process of FIG. 8 moves to operation 808.

Operation 808 depicts determining if there is an unexamined personal status. Where a central server maintains personal statuses for multiple users, these multiple personal statuses may be stored in a list, similar to the list of augmented reality devices described in operation 804, and determining whether there is an unexamined personal status may be performed in a manner similar to determining whether there is an unexamined augmented reality device in operation 804.

Where there is a p2p architecture (such as the one depicted in FIG. 5), it may be that each augmented reality device maintains at most one current status, and determining whether there is an unexamined personal status comprises determining whether this one current status both exists and has been examined.

If it is determined in operation 808 that there is an unexamined status, then the process of FIG. 8 moves to operation 810. Instead, if it is determined in operation 808 that there is not an unexamined status, then the process of FIG. 8 returns to operation 804.

Operation 810 is reached from operation 808, upon determining that there is an unexamined status. Operation 810 depicts selecting an unexamined status. In some embodiments, operation 810 may be implemented in a similar manner as operation 806, which depicts selecting an unexamined augmented reality device. After operation 810, the process of FIG. 7 moves to operation 812.

Operation 812 depicts determining the status permission. In embodiments, each personal status may be stored in conjunction with an indication of a permission required to view this status. Then, when the personal status is accessed, the corresponding status permission may be accessed and analyzed. This permission may be, for example, that anyone may access the personal status, that a specific person may access the personal status, or that someone who is a presenter may access the personal status (such as a lecturer in a classroom, or a speaker at a conference; in this case, the permission is associated with a person's role as a presenter rather than the person's identity as a specific person). In addition, the permission may comprise combinations of these permissions—for example, the permission associated with a particular status may be for two specific people as well as whoever the presenter is.

In some embodiments, operation 812 may lead to generating the augmented reality image based on the personal status for the first person in response to determining that a user account associated with an augmented reality device used to generate the augmented reality image has permission to access the personal status for the first person. In some embodiments, upon determining that anyone has permission to access the personal status, operation 812 may lead to generating the augmented reality image based on the personal status for the first person in response to determining that the personal status for the first person has a permission set to allow anyone to access the personal status.

Upon determining in operation 812 that the status permission is for a Specific Person, then the process of FIG. 8 moves to operation 814. Instead, upon determining in operation 812 that the status permission is for a Presenter, then the process of FIG. 8 moves to operation 816. Instead, upon determining in operation 812 that the status permission is for anyone, then the process of FIG. 8 moves to operation 818.

Operation 814 is reached from operation 812, upon determining that the status permission is for a Specific Person. Operation 814 depicts determining if the selected augmented reality device is associated with the specific person. It may be that a person logs in when using a particular augmented reality device (such as with a user name and password), and then there is a corresponding user account that the person logged into. This user account that is active on a given augmented reality device may be used to determine whether the augmented reality device is associated with a particular specific person.

In some embodiments, upon determining in operation 814 that the selected augmented reality device is associated with the specific person, operation 814 may lead to generating the augmented reality image based on the personal status for the first person in response to determining that the personal status for the first person has a permission set to allow a first user account to access the personal status, and the user account is associated with an augmented reality device used to generate the augmented reality image.

Where in operation 814 it is determined that the selected augmented reality device is associated with the specific person, then the process of FIG. 8 moves to operation 816.

Instead, upon determining in operation 814 that the selected augmented reality device is not associated with the specific person, then the process of FIG. 8 returns to operation 808.

Operation 816 is reached from operation 812, upon determining that the status permission is for a Presenter. Operation 816 depicts determining whether the augmented reality device is associated with a Presenter status. Continuing with the user account example of operation 814, a computing device that implements the process of FIG. 8 may maintain an identification of one or more user accounts that currently have Presenter status. Then, operation 816 may be implemented by determining whether the user account associated with the augmented reality device is one of these user accounts that currently does have Presenter status.

In some embodiments, upon determining in operation 816 that the augmented reality device is associated with Presenter status, operation 816 may lead to generating the augmented reality image based on the personal status for the first person in response to determining that the personal status for the first person has a permission set to allow a presenter of an event the first person is attending to access the personal status, and a user account associated with an augmented reality device used to generate the augmented reality image has a status as a presenter of the event.

In some embodiments, the personal status has access permissions that indicate that viewing the personal status is limited to user accounts with a presenter status. In such embodiments, a user account may have and then lose presenter status (for example, if a person presents during just one hour of a day-long conference). In such embodiments, when a user account loses presenter status, this user account no longer has access to personal statuses that require a Presenter status to access. This scenario of a user account losing presenter status may be addressed by, after generating the augmented reality image, determining whether a user account associated with a computer that generated the augmented reality image no longer has presenter status, and in response to determining whether the user account associated with the computer that generated the augmented reality image no longer has presenter status, halting presenting an augmented reality image that includes the personal status.

Where in operation 816 it is determined that the augmented reality device is associated with a Presenter status, then the process of FIG. 8 moves to operation 818. Instead, where in operation 816 it is determined that the augmented reality device is not associated with a Presenter status, then the process of FIG. 8 returns to operation 808.

Operation 818 is reached from operation 812 upon determining that the permission status is for anyone, operation 814 upon determining that the augmented reality device is associated with the specific person, and from operation 816 upon determining that the augmented reality device is associated with a Presenter status. Operation 818 depicts sending the personal status to the selected augmented reality device.

In some embodiments, operation 818 may comprise central server 402 of FIG. 4 or one of augmented reality devices 504-508 of FIG. 5 sending to another augmented reality device an indication of the personal status, along with a person who corresponds to that personal status. After operation 808, the process of FIG. 8 returns to operation 808.

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to process or flowchart illustrations, and/or block diagrams of methods, apparatus (systems), and computer program products according to embodiments of the present disclosure, and these illustrations may comprise one or more operations. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for viewing a personal status using augmented reality, the method comprising:
    capturing an image of a physical scene, the physical scene including a first person;
    determining an identity of the first person in the image;
    in response to determining the identity of the first person, determining whether there is a personal status for the first person based on the determined identity of the first person; and
    generating an augmented reality image based on the personal status for the first person such that the personal status is displayed in a location proximal to the first person,
    wherein the personal status is displayed differently upon determining that the personal status was viewed.

2. The computer-implemented method of claim 1, further comprising:
    capturing a second image, the first person being in a different location in the second image than in the first image; and
    generating a second augmented reality image based on the personal status for the first person such that the personal status is displayed in a location proximal to the first person being in the different location.

3. The computer-implemented method of claim 1, wherein the location proximal to the first person is above the first person's head.

4. The computer-implemented method of claim 1, further comprising:
    after generating the augmented reality image, determining whether the personal status of the first person has been updated; and
    generating a second augmented reality image based on the updated personal status for the first person such that the updated personal status is displayed in a location proximal to the first person.

5. The computer-implemented method of claim 1, further comprising:
    generating the augmented reality image based on the personal status for the first person; and
    upon determining that the first status is indicative of a question, coloring the personal status with a first color.

6. The computer-implemented method of claim 5, further comprising:
    generating the augmented reality image based on the personal status for the first person with the personal status colored with a second color, upon determining that the first status is indicative of a comment.

7. The computer-implemented method of claim 1, wherein the personal status has access permissions that indicate that viewing the personal status is limited to user accounts with a presenter status.

8. The computer-implemented method of claim 1, further comprising:
    halting presenting the augmented reality image upon determining that a user account associated with a computer that generated the augmented reality image no longer has a presenter status.

9. The computer-implemented method of claim 1, wherein the different display of the personal status upon determining that the personal status was already viewed is based on a displayed icon.

10. A computer system for viewing a personal status using augmented reality, comprising:
a processor, a computer-readable memory, a computer-readable tangible storage device, and program instructions stored on the storage device for execution by the processor via the memory, wherein execution of the program instructions by the computer system configures the computer system to:
determine an identity of a first person depicted within a captured image of a physical scene;
in response to determining the identity of the first person, determine whether there is a personal status for the first person based on the determined identity of the first person; and
generate an augmented reality image based on the personal status for the first person such that the personal status is displayed in a location proximal to the first person,
wherein the personal status is displayed differently upon determining that the personal status was viewed.

11. The computer system of claim 10, wherein execution of the program instructions further configures the computer system to:
halt presenting the augmented reality image upon determining that a user account associated with a computer that generated the augmented reality image no longer has a presenter status.

12. The computer system of claim 10, wherein execution of the program instructions further configures the computer system to:
capture a second image, the first person being in a different location in the second image than in the first image; and
generate a second augmented reality image based on the personal status for the first person such that the personal status is displayed in a location proximal to the first person being in the different location.

13. The computer system of claim 10, wherein execution of the program instructions further configures the computer system to:
determine the identity of the first person depicted within the captured image of the physical scene based on performing a facial recognition on the captured image, or based on determining a location of computing device associated with the first person.

14. A computer program product, comprising:
a computer readable storage medium having programming instructions embodied therewith, the program instructions executable by a computer cause the computer to:
determine an identity of a first person depicted in a captured image of a physical scene;
in response to determining the identity of the first person, determine that there is a personal status for the first person based on the determined identity of the first person; and
generate an augmented reality image based on the personal status for the first person such that the personal status is displayed in a location proximal to the first person,
wherein the personal status is displayed differently upon determining that the personal status was viewed.

15. The computer program product of claim 14, wherein the program instructions executable by the computer further cause the computer to:
save an indication of the personal status in a computer memory;
save an indication of a second personal status for the first person in a computer memory; and
display the indication of the personal status and the indication of the second personal status on a computer display, independent of a physical location of the first person.

16. The computer program product of claim 14, wherein the program instructions executable by the computer further cause the computer to:
save an indication of the personal status in a computer memory;
save an indication of a second personal status for a second person in a computer memory; and
display the indication of the personal status and the indication of the second personal status on a computer display, independent of a physical location of the first person and a physical location of the second person.

17. The computer program product of claim 14, wherein the program instructions executable by the computer further cause the computer to:
upon generating the augmented reality image, determine whether the personal status of the first person has been updated to indicate no personal status; and
generate a second augmented reality image based on the updated personal status for the first person such that the second augmented reality image shows no personal status for the first person.

18. The computer program product of claim 14, wherein the program instructions executable by the computer further cause the computer to:
generate the augmented reality image based on the personal status for the first person with the personal status colored with a first color in response to determining that the first status is indicative of a question.

19. The computer program product of claim 18, wherein the program instructions executable by the computer further cause the computer to:
generate the augmented reality image based on the personal status for the first person with the personal status colored with a second color in response to determining that the first status is indicative of a comment.

20. The computer program product of claim 14, wherein the program instructions executable by the computer further cause the computer to:
halt presenting the augmented reality image upon determining that a user account associated with a computer that generated the augmented reality image no longer has a presenter status.

* * * * *